(12) United States Patent
Kryszczynski et al.

(10) Patent No.: US 7,315,371 B2
(45) Date of Patent: Jan. 1, 2008

(54) MULTI-CHANNEL SPECTRUM ANALYZER

(75) Inventors: Tadeusz Kryszczynski, Warsaw (PL); Olga Pawluczyk, Conestogo (CA); Rafal Pawluczyk, Kitchener (CA)

(73) Assignee: P&P Optica Inc. (CA)

( * ) Notice: Subject to any disclaimer, the term of this patent is extended or adjusted under 35 U.S.C. 154(b) by 439 days.

(21) Appl. No.: 10/762,560

(22) Filed: Jan. 23, 2004

(65) Prior Publication Data

US 2005/0162649 A1   Jul. 28, 2005

(51) Int. Cl.
  *G01J 3/28* (2006.01)
(52) U.S. Cl. ...................................... 356/328
(58) Field of Classification Search .................. 356/328
  See application file for complete search history.

(56) References Cited

U.S. PATENT DOCUMENTS

| | | | |
|---|---|---|---|
| 4,497,540 A | 2/1985 | Breckinridge et al. | |
| 4,588,885 A | 5/1986 | Lovoi et al. | |
| 4,650,321 A | 3/1987 | Thompson | |
| 4,678,332 A * | 7/1987 | Rock et al. .................. | 356/328 |
| 4,743,112 A | 5/1988 | Burke | |
| 4,773,756 A | 9/1988 | Blechinger | |
| 4,948,256 A * | 8/1990 | Lin et al. ..................... | 356/328 |
| 4,950,077 A * | 8/1990 | Manabe ....................... | 356/328 |
| 5,139,335 A | 8/1992 | Lundeen et al. | |
| 5,149,959 A | 9/1992 | Collins et al. | |
| 5,149,970 A | 9/1992 | Whitney | |
| 5,166,755 A | 11/1992 | Gat | |
| 5,216,484 A | 6/1993 | Chao et al. | |
| 5,257,086 A | 10/1993 | Fateley et al. | |
| 5,297,555 A * | 3/1994 | Martens ........................ | 600/476 |
| 5,377,003 A | 12/1994 | Lewis et al. | |
| 5,379,065 A | 1/1995 | Cutts | |
| 5,394,237 A | 2/1995 | Chang et al. | |
| 5,402,227 A | 3/1995 | Schuma | |
| 5,420,681 A | 5/1995 | Woodruff | |
| 5,528,368 A | 6/1996 | Lewis et al. | |
| 5,539,517 A | 7/1996 | Cabib et al. | |
| 5,539,518 A | 7/1996 | Bennett | |
| 5,606,413 A | 2/1997 | Bellus et al. | |
| 5,627,639 A | 5/1997 | Mende et al. | |
| 5,708,504 A | 1/1998 | Hopkins | |
| 5,717,487 A | 2/1998 | Davies | |
| 5,759,781 A | 6/1998 | Ward et al. | |
| 5,760,899 A | 6/1998 | Eismann | |
| 5,768,040 A | 6/1998 | Macenka et al. | |
| 5,777,736 A | 7/1998 | Horton | |
| 5,781,290 A | 7/1998 | Bittner et al. | |
| 5,790,188 A | 8/1998 | Sun | |
| 5,792,610 A | 8/1998 | Witney et al. | |
| 5,796,512 A | 8/1998 | Wachman et al. | |
| 5,828,451 A | 10/1998 | Bellus et al. | |
| 5,834,203 A | 11/1998 | Katzir et al. | |

(Continued)

*Primary Examiner*—Roy M. Punnoose
(74) *Attorney, Agent, or Firm*—Katten Muchin Rosenman LLP (57) ABSTRACT

A spectrum analyzer for the simultaneous analysis of electromagnetic radiation delivered to it from either multiple sources or from a linear segment along a source surface, and arranged as either continuous or discrete set of points along a short piece of a straight line referred to herein as a slit. In one embodiment of the invention, the optical design of the dispersing part of the analyzer provides essentially stigmatic spots for any spectral band up to one octave wide in the spectral range of about 400 nm to about 2500 nm.

20 Claims, 6 Drawing Sheets

U.S. PATENT DOCUMENTS

| | | |
|---|---|---|
| 5,835,214 A | 11/1998 | Cabib et al. |
| 5,841,577 A | 11/1998 | Wachman et al. |
| 5,856,871 A | 1/1999 | Cabib et al. |
| 5,863,504 A | 1/1999 | Heffelfinger et al. |
| 5,867,264 A | 2/1999 | Hinnrichs |
| 5,880,834 A | 3/1999 | Chrisp |
| 5,926,283 A | 7/1999 | Hopkins |
| 5,982,497 A | 11/1999 | Hopkins |
| 5,986,758 A | 11/1999 | Lyons et al. |
| 5,991,024 A | 11/1999 | Bauer et al. |
| 6,002,476 A | 12/1999 | Treado |
| 6,007,994 A | 12/1999 | Ward et al. |
| 6,008,492 A | 12/1999 | Slater et al. |
| RE36,529 E | 1/2000 | Lewis et al. |
| 6,031,619 A | 2/2000 | Wilkens et al. |
| 6,043,039 A | 3/2000 | Bar-Am et al. |
| 6,100,974 A | 8/2000 | Reininger |
| 6,151,112 A | 11/2000 | Atkinson et al. |
| 6,288,781 B1 | 9/2001 | Lobb |
| 6,490,075 B1 | 12/2002 | Scheps et al. |
| 6,552,788 B1 | 4/2003 | Castle |
| 6,636,305 B2 | 10/2003 | Zhao et al. |
| 6,646,264 B1 | 11/2003 | Modiano et al. |
| 6,650,413 B2 | 11/2003 | Thibault et al. |
| 6,665,072 B2 | 12/2003 | Hoyt |

\* cited by examiner

MULTI-CHANNEL SPECTRUM ANALYZER

FIELD OF THE INVENTION

The present invention relates generally to spectrum analyzers and more specifically to devices adapted to analyze the spectral composition of electromagnetic radiation in near ultraviolet, visible and near infrared spectral bands of electromagnetic radiation, delivered to an entry port of the device in a form of a narrow slit, simultaneously for each point of the slit.

BACKGROUND OF THE INVENTION

In many fields, biology and medicine in particular, there is a rapidly increasing need for a simultaneous spectral analysis of electromagnetic radiation produced by individual points of a radiation source, radiation produced by different sources or produced by one or more sources and affected by different points of an extended object, such as different locations or parts of a human body, for example. The need becomes especially critical in optical spectral tomography of continuously varying or changing systems such as a living human body. To address these problems spectrum analyzing instruments such as multi-channel or line imaging spectrometers that allow for simultaneous spectral analysis of radiation coming from different objects, different points of one object or continuous linear or two dimensional areas on the object, have been proposed and implemented in the art.

Generally, each of these known spectrum analyzing instruments can be associated with one of the following three categories of spectrum analyzers: (1) those which perform simultaneous spectral analysis at each point of a two-dimensional image; (2) those which perform analysis for points arranged along a single straight or curved line; and (3) those which perform analysis for one point of the source or object only.

Spectrum analyzers belonging to the first category generally provide more or less complete spectral information for a two-dimensional array of points. Spectrum analyzers belonging to the second category provide information only for a set of points arranged along a single line and, therefore, to obtain complete information about a two-dimensional object, a set of consecutive measurements along different lines on the surface of the source or object has to be collected by applying a single dimensional scanning. With respect to spectrum analyzers belonging to the third category, two-dimensional scanning is required in order to obtain spectral information for all points of a two-dimensional surface of the source or the object (also referred to herein as the "tested target" or the "target").

An advantage to using spectrum analyzers belonging to the first category is that spectral information can be simultaneously collected from all points of a two-dimensional image. However, a large amount of information has to be simultaneously collected and processed, leading either to large costs, or to reduced performance. Some instruments in this category such as scanning Fourier transform imaging spectrometers or those using tunable or switchable filters for example, do not perform well when observing unstable objects, since variations of the total radiation intensity caused by instability of the object are usually translated into spectral variations. A second sub-family of full two-dimensional spectrometers uses the "tomographic method"; these however often suffer from an inverse relationship between spatial and spectral resolution, where spatial resolution is decreased if spectral resolution is increased, and vice versa.

Spectrum analyzers belonging to the second category perform spectral analysis of radiation points arranged along a line, and allow for simultaneous registration of an entire spectrum for each point along the line with high spatial and spectral resolution. Performance is not affected by instability of an object, as long as the spectral properties of the object remain stable. However, a scanning line typically has to be relocated across the two-dimensional image to obtain complete two-dimensional spectral information. However, if the number of points of interest on the surface of the object is limited, the radiation from these points can be brought to different points of an analyzed line, by using optical fibers for example, and the complete information for all these points can be simultaneously collected. Imaging spectrometers working in such a configuration are often referred to as multi-channel spectrometers.

A single point spectrum analyzer has the disadvantage that there is no way to get simultaneous spectral information for more than a single point. Even if many such instruments are used to gather spectral information for several points, a very careful cross-calibration of detectors and complex triggering mechanism would need to be implemented.

The present invention relates generally to spectrum analyzers belonging to the second category. As noted above, these are analyzers which are able to simultaneously determine spectral information for a number of points arranged along a single line, and more specifically, arranged along a single straight line. The single line may also be referred to herein as a "slit" of the spectrum analyzer. The spectrum analyzers themselves may also be referred to herein as "multi-channel" spectrometers or "line imaging" spectrometers.

Various types of spectrum analyzers are known in the art, which, for each point along a slit, perform an angular spread of the radiation in the plane perpendicular to the long direction of the slit in a way that is specific to the wavelength of the radiation delivered to that point of the slit. By means of auxiliary optics, the radiation of each wavelength is usually focused to the smallest possible point, and the angular spread is transformed into a spatial spread, ideally along a single line for each point of the slit. Position of the focal point along the line is usually uniquely correlated with the wavelength of the radiation focused at that point. Therefore, the distribution of the radiant flux along the line can be uniquely associated with the spectral distribution of the spectral radiant flux of the radiation delivered to the corresponding point of the slit.

The angular spread of radiation as a function of the wavelength can be obtained either by means of a prism made of a material transparent to the analyzed radiation and which demonstrates different properties for radiation of different wavelengths, or by means of a diffraction grating containing a fine periodic or quasi-periodic linear structure that affects the propagation of the incident radiation in a manner that is dependent on the wavelength.

Generally, there are two types of diffraction gratings: those which send disturbed radiation back into the same half-space from which the radiation was delivered to the grating—such gratings are usually referred to generally as "reflecting" or "reflective" gratings; and those generally referred to as "transmission" gratings, which send the majority of the disturbed radiation into the second half-space. Each of these types of gratings has some known advantages and disadvantages associated with it. While traditionally the application of reflective gratings has been more common, recently, the inventors have observed that the second type of grating is gaining an increased importance in imaging spectrometers.

Transmission gratings typically offer higher efficiency in a wide spectral range, and allow for the separation of focusing optics from collimating optics into two separate half-spaces. This eliminates physical interference between collimating and focusing optics observed in highly dispersive spectrometers, and in properly designed optical systems, further allows for a reduction of the scattered radiation, thereby improving the photometric dynamic range of the instrument.

While both reflective and transmission gratings can be produced on substrates of different shapes, transmission gratings are usually made on a flat substrate, very often sandwiched between two plates made of a material transparent to the analyzed radiation, which sometimes absorbs radiation outside the range of interest.

These types of transmission gratings demonstrate optimal performance when analyzed radiation is delivered to the grating in a form of a collimated beam. As a result of the interaction of the radiation with the diffraction grating, some, preferably an as large as possible part of the incident radiation, changes the direction of its propagation. For an incident beam whose axis is perpendicular to the fringes of the grating and which creates an angle α with the normal to the grating, a new angle of propagation β of the diffracted beam is a function of the wavelength λ, period of the grating d, and a sine of an angle α of the incidence as shown in the following equation:

$$\sin(\beta) = \sin(\alpha) + k \cdot \frac{\lambda}{d} \quad (1)$$

$k = 0, \pm 1, \pm 2, \ldots$ is an order of diffraction.

For a selected κ (most often +1 or −1), the sine of the diffraction angle β depends on the sine of the angle α of incidence, and is a linear function of the wavelength λ. This means that a collimated beam containing radiation of different wavelengths is transformed into a fan of beams with axes perpendicular to the grating fringes, creating a wavelength dependent angle β with the normal to the grating. A simple focusing lens with wavelength independent focal length f, placed immediately after the grating would focus each beam of the fan into a spot placed on an arc with a center coincident with the center of the lens. The spot would be smallest for the beam of the radiation whose axis coincides with the axis of the lens, and would deteriorate with departure from this condition due to aberration introduced by the lens. The angular distribution of these points on the arc would be governed by equation (1). It will be understood by persons skilled in the art that if a flat array of detectors was used for registration of the radiation focused in such a way, the best focus would be obtained for a single point on axis of the lens or, by sacrificing some performance, for two intersection points of the detector array with the arc. Usually, the focal length of a simple lens takes different values for radiation with different wavelengths, transforming the arc into a more complex curve. The variation of the focal length with wavelength leads to the dependency of magnification on wavelength, thus causing the length of a slit image and its quality to be also dependent on the wavelength. The position of the detector surface in relation to the continuum of different focal lengths determines which wavelength of radiation will produce the smallest spot on the surface of the detector array. It is clear from this simple consideration that both the distance and the angle between normal to the array and the lens axis will have an impact on how well radiation with different wavelengths is focused on the surface of the array; accordingly, both will have an impact on the spatial and spectral resolutions of transmission grating based instruments.

For example, such simple lenses may cause various deformations of the spectrum, called color keystoning and smile (or frown), as described for instance in U.S. Pat. No. 6,552,788 (hereinafter "788 patent") issued to Castle. As a result of such distortions, the image does not fit well to a detector array of square or rectangular shape, and may cause either some losses of the radiation or inefficient utilization of the array. Furthermore, such image has to be properly rescaled with mathematical tools to eliminate distortion, which under certain circumstances may be undesirable. Castle describes that a smile (or frown) "arises at the dispersing element when the ray bundles exit the dispersing element at compound angles relatively to the flat surface". Castle believes that this distortion can be eliminated by the proper design of the optical system with the application of modern lens design software, and is not looking for conditions when this distortion is minimal. Castle further teaches that when the principal rays of a radiation beam (producing an image of the slit for a particular wavelength (color) at the distance determined by a focal length of the lens for this wavelength) intersect the surface of the detector perpendicular to the optical axis of the disclosed system, the keystone distortion arises as a result of a parallax due to the intersection of the principal rays with the detector plane at heights different from these in the image plane of the slit and, as shown in FIG. 6 of the '788 patent, dependent on the wavelength of the radiation, which for a given lens determines the effective focal length of the lens. Therefore, to eliminate the parallax, the detector has to be inclined to catch the images of the slit at the best focus for each wavelength. According to Castle, this would eliminate the keystone effect.

The problem is, however, that the focal length of the lens in the normal situation does not vary linearly with wavelength (see e.g. FIG. 7a and FIG. 7b of the '788 patent), and hence, the images of the slit produced by radiation with different wavelengths normally would not be placed on the flat surface and would not fit well to the flat detector array. Therefore, Castle proposes to select optical glasses for the lens production specifically to secure a linear variation of the focal length as a function of the wavelength. According to Castle, the combination of a proper design and a linear variation of longitudinal chromatic aberration with wavelength together with a suitable slant of the detector array to the optical axis of the lens should eliminate both kinds of the distortion. As explained in the '788 patent starting at column 4, line 45: "The invention takes advantage of the dispersive effects of glass in order to balance effects and produce a lens design that focuses linearly with wavelength. That is, if there exist three wavelengths with the second wavelength midway between other two, the focus position of the second wavelength will be midway between the other two focus positions, along the optical axis of the lens assembly". This implies that the disclosed system redistributes delivered radiation in such a way that the wavelength of radiation linearly changes with the distance; i.e. produces such distribution of the radiation that the wavelength of radiation on the surface of the detector array is a linear function of the distance on the surface of the array. In other words, this should produce linear spectral dispersion, and such spectrometer could be easily calibrated through the application of light with two known spectral lines.

The present inventors have observed, however, that Castle did not notice that if such distribution is produced as a result of a linear change of the focal length of the applied focusing lens, this would also cause the linear change of the slit image, resulting in the keystone distortion. Therefore, in this case, the proposed solution taught by Castle may not resolve the problem as formulated in the '788 patent.

Furthermore, with respect to the imaging spectrometer, the '788 patent also does not take into account the fact that the grating itself produces spectral dispersion, which is a non-linear function of the diffraction angle and cannot be easily transformed into linear dependence on the surface of the photodetector array, as demonstrated in U.S. Pat. No. 6,650,413 (hereinafter "the '413 patent") issued to Thibault et al., for example.

In addition to the problems discussed above, the references mentioned above do not fully consider the impact of the working conditions of the grating on the performance of the spectrometer, and how the configuration of the dispersing part of the analyzer (also referred to herein as the "disperser"), could be optimized.

SUMMARY OF THE INVENTION

The present invention is directed to an improved spectrum analyzer and components thereof that address at least some of the disadvantages of the known systems described above. For example, the '413 patent proposes various means to produce linear distribution of the spectral components on a surface of the photodetector. It is generally understood that complete spatial linearization of the spectrum is impossible and high resolution spectrometers have to be individually wavelength calibrated. For this reason, the present invention does not try to linearize wavelength response in function of the distance; instead, the emphasis is on producing a system that provides a constant size of the slit images for all wavelengths in a working spectral range to produce equally distanced spectra for all channels in the entire working spectral range.

In one broad aspect, the present invention is directed to the configuration of a spectrometer, which minimizes the negative impact of the grating position on performance of the spectrometer through the selection of an optimal configuration of the grating position in a spectrum disperser, and produces constant size images of slit for all wavelengths of spectral bands up to one octave wide in any part of an about 400 nm to about 2500 nm spectral range.

The shortcomings of a simple lens, including deformation of the shape of simple geometrical figures when projected by the lens are well recognized, and many specialized complex optical systems containing many lenses have been devised and produced for different applications. Many of these lenses were designed to produce identical, undistorted flat images for all wavelengths of used (mostly visible) radiation, under an assumption that beams of all used wavelengths have identical shape and travel the same optical path. There are also known optical systems (as, for example, microscopic objectives), which correct optical aberrations introduced by plane parallel glass plate (cover glass) for all wavelengths traversing the cover glass along the same path; however, none of these address the situation where different wavelengths take different paths.

Therefore, there exist optical systems, mainly objectives developed for high quality photographic cameras, which essentially satisfy the majority of requirements of high performance imaging spectrometers, and there exists imaging spectrometers designed with the use of such objectives. Since such objectives simultaneously satisfy conditions for achromats, aplanats and anastigmats, they have quite complex construction, and usually at a minimum contain five lenses made of more than two optical glasses. They are also usually designed to work in limited, most often visible, spectral range. To correct the spherical chromatic aberrations, such objectives usually contain menisci with short radii of curvatures. Because of the large number of elements with large curvature (short radii of curvature), such objectives can cause significant loss of radiation and produce significant background of the scattered radiation. Since they also do not take into consideration the fact that in spectrometers, the beams of different wavelengths travel different optical paths, such objectives do not utilize all design potential for such applications.

Typical high performance imaging spectrometers with such lenses cover spectral ranges significantly narrower than a single octave, use complex objectives developed for high quality imaging applications (most often for photographic or TV cameras) for collimation and focusing, and cannot be used outside a designed spectral band without severe performance deterioration. Since optical elements used in such spectrometers have been designed for other applications, they neither properly address specific problems of imaging spectrometers nor exploit design opportunities provided by specific requirements of imaging spectrum analyzers, such as the fact that the radiation of different wavelengths produced by a single object point travels different optical paths and has to be focused into spatially separated image points. This unsuitability of existing optical elements for spectroscopic applications causes images of the straight slit produced with radiation of different wavelengths to be curved and have different lengths.

While in principle, distortion of the slit image might be mathematically corrected by proper calibration of the reading system and further data processing, this undoubtedly creates additional difficulties in the processing of complex spectral distributions along the slit, and causes problems associated with this loss of resolution along the slit that cannot be compensated for. In one aspect of the present invention, there is provided a simple high performance focusing objective, able to produce high quality spectrally dispersed images in any spectral band up to one octave wide in the spectral range between about 400 nm and about 2500 nm. While separate known objectives may be used for different spectral bands of such spectral range, even for limited spectral bands, because of the requirement of achromatism, such objectives usually are made of lenses of more than two different materials, significantly contributing to the cost of such systems.

Accordingly, in another broad aspect, the present invention is directed to a focusing objective of a multi-channel or line imaging spectrometer, which contains not more than three lenses made of two different materials, specifically designed for multi-channel or line imaging spectrometers, and working in various bands of visible and near infrared radiation. These components take advantage of the fact that beams with different wavelengths travel different paths, and cooperate with an optimally placed transmission diffraction grating, which in one embodiment of the invention, is a flat volume phase holographic diffraction grating with straight diffractive fringes, having a diffraction active substance sandwiched between two plane parallel plates made of material transparent for used radiation with surfaces coated with antireflection coatings specific for used radiation. A spectral band up to one octave wide in the spectral range anywhere between about 400 nm and about 2500 nm is covered, and wavelength independent, constant magnification of the slit projected on a photodetector array is provided.

In another broad aspect, the present invention is directed to a high performance multi-channel or line imaging spectrometer containing a transmission diffraction grating arranged in an optimal way, having a focusing refractive objective built with the application of a smaller number of lenses, the design of which takes advantage of the fact that beams of different wavelengths take different paths through the system and that linear dependence on wavelength neither focal length of the objective nor focal spot position is required. The design is specifically optimized to produce high-resolution, flat, spectrally dispersed images of sources aligned along the line, within a spectral band up to one octave wide, arbitrary selected from the spectral range of about 400 nm to about 2500 nm.

In another broad aspect, the present invention is directed to a multi-channel or line imaging spectrometer containing transmission diffraction grating and refractive collimating and focusing optical elements, whose optical system produces stigmatic images for each point of the straight slit for every spectral component within the selected spectral range.

In another broad aspect, the present invention is directed to a multi-channel or line imaging spectrometer containing transmission diffraction grating with refractive optical elements, whose optical system produces straight images of the straight slit for every spectral component within the selected spectral band.

In another broad aspect, the present invention is directed to a multi-channel or line imaging spectrometer containing transmission diffraction grating with refractive optical elements whose optical system produces images of the slit with constant magnification independent on wavelength of the used radiation.

In another broad aspect, the present invention is directed to the production of the multi-channel or line imaging spectrometer containing a smaller number of easier to produce optical lenses that can be made of a small number of optical materials.

The main advantages of a spectrometer designed in accordance with an embodiment of the present invention may become particularly apparent in applications for the simultaneous analysis of spectra from different targets or different points of the same target, especially if the target (e.g. humans) demonstrates spatial instabilities. A proper design of radiation collecting optics becomes crucial in these kinds of applications if optimal extraction of required information is to be attained. Therefore, in yet another broad aspect, the present invention is directed to a radiation collecting system for a multi-channel spectrum analyzer designed in accordance with an embodiment of the present invention, allowing for optimal use of the analyzer.

The present invention relates generally to the field of devices (called multi-channel or line imaging spectrometers) for the analysis of spectral composition of electromagnetic radiation in ultraviolet (UV), visible (VIS) and near infrared (NIR) spectral ranges of electromagnetic radiation, delivered to an entry port of the device in a form of a narrow slit, simultaneously for each point of the slit. The information can be used either for the characterization of a source of radiation, for the spectroscopic chemical analysis of a source of radiation, or for the determination of optical properties and the spectroscopic chemical analysis of the object affecting the radiation produced by a source with known optical properties.

In accordance with one embodiment, the invention provides optical configuration of a relatively simple but high performance multi-channel or line imaging spectrometer with plane volume phase holographic transmission diffraction grating. The spectrometer contains a slit playing the role of a linear object. The radiation from each point of the object is collected by a lens whose focal length, and hence focusing power, remains practically constant in any spectral band not substantially wider than one octave, placed in any part of the spectral range expanding from about 400 nm to about 2500 nm. Within the selected spectral band, the lens transforms a divergent beam emitted by any point on the slit into a corresponding collimated beam, and all beams emerging from the separate points along the slit, in this embodiment, are delivered to a volume phase holographic transmission diffraction grating containing an optically active layer sandwiched between two optically transparent plates, the active layer having essentially periodic modulation of the refractive index. The period of the modulation of the refractive index is selected to produce dispersion required for spectral spread of the diffracted radiation over the length of the applied detector array, when a focusing objective, specifically designed for this purpose, is placed behind the grating and before the detector. It will be understood by persons skilled in the art that any other plane transmission grating, including those not sandwiched between two plates, may be used in some spectrometer implementations, if the compromise in performance is considered acceptable.

The focusing objective in this embodiment is designed to produce a high resolution, flat, undistorted spectral image of the slit, with constant, wavelength independent magnification for a spectral band about one octave wide placed anywhere between about 400 nm and about 2500 nm of spectral range. In this embodiment, this is achieved with an objective, consisting of three lenses: a relatively thin positive front lens; a very thick, rod-like, negative meniscus made of material with a higher refractive index than the front lens; and a relatively thin, positive back lens made of the same material as the front lens. Both the refractive properties of the glasses and the axial thickness of the lenses were selected to produce a focusing objective which simultaneously secures a substantially constant sized focal spot for all wavelengths across the selected working spectral band, and a wavelength independent, constant size slit image projected on a flat surface of a photodetector array, essentially perpendicular to the fan axis of the diffracted radiation. Remnant positional chromaticity of the wide diffracted beams is corrected by the appropriate selection of suitable glasses which forces it to vary linearly with the position on the array; the impact of this chromaticity is eliminated by introducing a small tilt to essentially perpendicular to the axis photodetector array and a corresponding longitudinal and lateral shift of the array, different for different spectral working bands. This degree of freedom allows for the application of the designed objective in any part of the about 400 nm to about 2500 nm spectral range under the condition that the used spectral band is not substantially wider than one octave.

The present inventors realized that the linear dependence of the positional chromaticity on the surface of the detector array does not ensure linearity of spectral dispersion; therefore, if there exist three spectral components, with wavelength of the second midway between the wavelengths of the first and third components, the focal spot of the second spectral component is not necessarily placed at the midway between the remaining two. It was realized that linear wavelength calibration may not be sufficient for some applications, and a more complex, higher order calibration based on several wavelengths may need to be applied in such cases. This may be unavoidable if the same, relatively simple focusing objective (possibly with antireflection coatings optimized for a working spectral band) in different regions of a wide spectral range is to be used; however, such an objective improves performance and significantly simplifies production process, thereby contributing to the reduction of spectrometer production costs.

In variant embodiments of the invention an objective of similar or better performance may be designed for narrower spectral bands.

In variant embodiments of the invention objectives can be used in conjunction with reflective gratings, when the dispersion of the grating, selected working spectral range and configuration of the spectrometer eliminate the problem of the physical interference of the collimating and focusing optics.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE INVENTION

The terms "spectrum analyzer" and "spectrometer" are used interchangeably in the description and in the claims.

In one aspect, the present invention provides a high performance, multi-channel (also referred to herein as a line imaging spectrum analyzer) for simultaneous registration of spectra of radiation delivered to any point arranged along a piece of straight line, referred to herein as a slit-like entry port (or slit) of the spectrum disperser. It is well known that the majority of existing spectrophotometers with gratings or prisms are not built to resolve spectral differences of radiation delivered to different points of the slit, and that they generally provide information only about spectral properties of the total radiation delivered. Such instruments are easier to build and are satisfactory for many applications. There exist applications, however, when comparison of spectral composition of radiation produced at different points of the direct or indirect source of the radiation is required. In one aspect, the present invention provides a means for such comparison in the form of a multi-channel spectrum analyzer, able to differentiate the spectra of the radiation delivered to different points of the slit, being at an entry port of the spectrum disperser.

Figure 1:
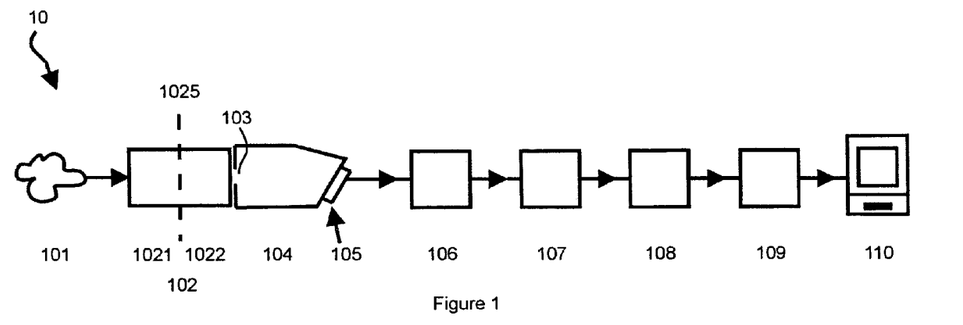
FIG. 1 is a schematic block diagram showing a multi-channel spectrum analyzer according to an embodiment of the present invention.

Referring to FIG. 1, a schematic block diagram of such a multi-channel spectrum analyzer according to an embodiment of the present invention is shown generally as 10. The radiation from a target 101, that may itself produce radiation (in that case, target 101 may be referred to as a primary source), or from an object (which may be referred to as a secondary source) illuminated by one or more external primary sources, is collected by a radiation collecting and delivery optics or system 102. Radiation collecting and delivery optics 102 delivers the captured radiation to an entry port 103 of a spectrum disperser 104. Spectrum disperser 104 performs spatial separation of radiation of different wavelengths for each point of the entry port and delivers it to the photodetector array 105, which transforms a photometric signal into an electrical signal. The electrical signal is captured by an electronic circuit 106 and is converted to a digital form with an analog/digital converter 107. The digital signal is then digitally pre-processed by digital signal processing unit 108, and information is stored in memory 109. The information can be accessed by one or more external computers 110 for further analysis, and presented to users through a graphic user interface 111.

The role of radiation collecting and delivery optics 102 is to collect the radiation from the tested target (primary or secondary source) 101, prepare it for analysis and deliver it to a slit-like entry port 103 hereinafter ("slit") of the spectrum disperser 104. In this embodiment the radiation collecting and delivery optics 102 may be considered to consist of two blocks: collecting optics 1021 and radiation modifying or shaping optics 1022, whose roles may partially overlap and vary depending on the application.

In one preferred embodiment of the multi-channel spectrum analyzer of FIG. 1, the role of the collecting optics is to collect the radiation from the target 101 with some radiation collecting optical element such as a telescope, f-theta lens, telecentric lens, photographic objective, microscopic objective or any other optical element known in the art, and to bring an image of a desired fragment of a magnified, not magnified or de-magnified image of the target 101 either to an entry port of the radiation shaping optics 1022, or, if spectral modification of the signal is not required, to project a desired fragment of the target image directly on the slit 103 being the entry port of the spectrum disperser 104. This is usually achieved by some targeting means (e.g. by mechanical movement of the target 101 or movement of the image of the target 101 by means of an optical scanner) or, in some cases, by movement of the analyzer itself to a desired part of the object. This may also be achieved through continuous relative movement of the object and analyzer (e.g. the target 101 moving under the analyzer, via conveyor belt for instance; or analyzers moving over the target such as where an analyzer may be operable on a moving plane or satellite for instance). To be able to perform their task, the radiation collecting optics may in some cases, have to include various radiation combining elements to bring the radiation from different targets or from different points of the same target, or from a combination of various points of various targets to the spectrum disperser 104.

Figure 2:
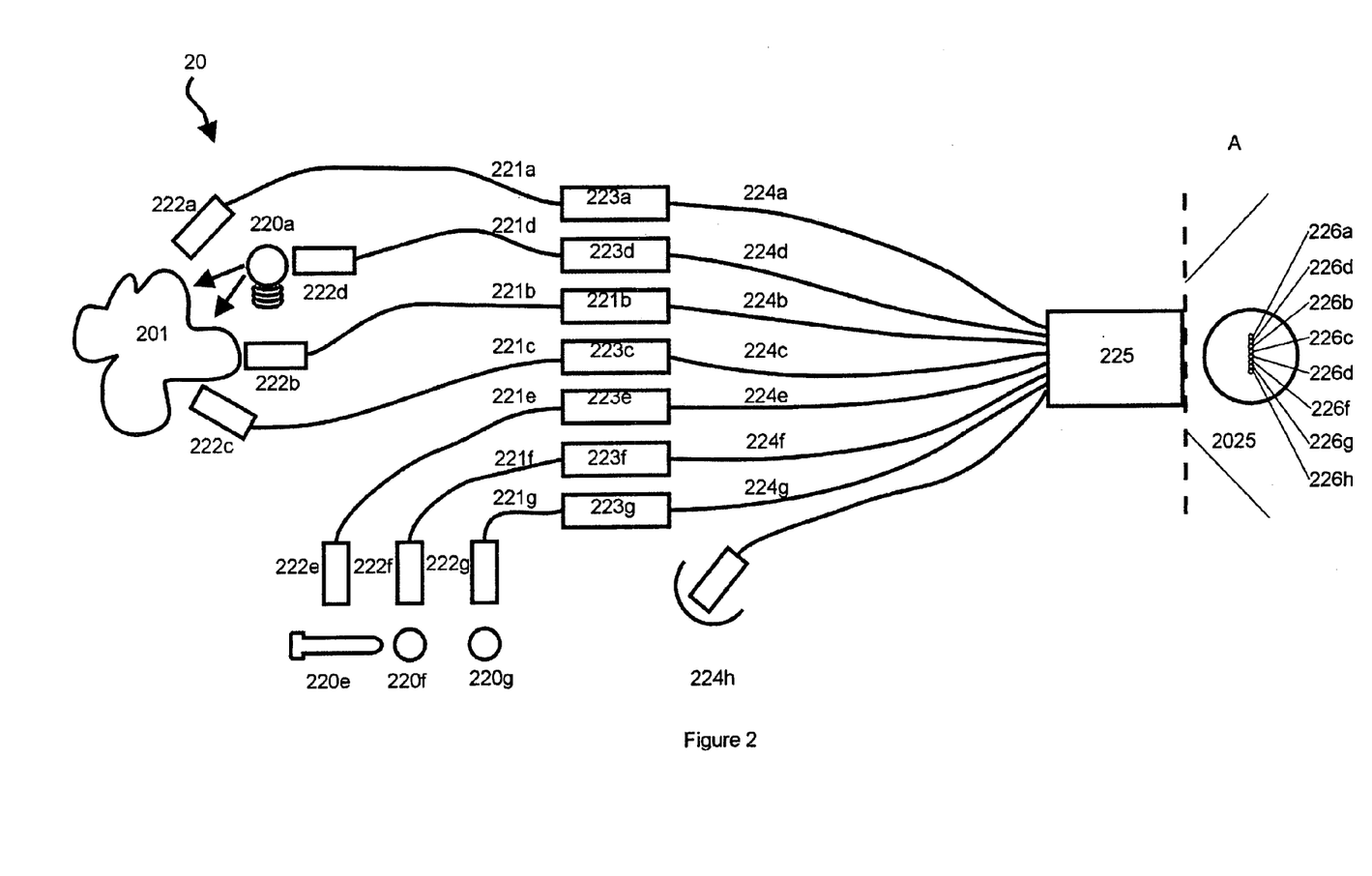
FIG. 2 is a schematic diagram showing a fiber-optics radiation collection and delivery system for a multi-channel spectrometer in an embodiment of the present invention, which allows for independent control of radiant flux delivered by each channel and simultaneous optimization of the instrument performance for all channels.

In particular, in one embodiment of the present invention, the radiation from points of interest is collected by means of a special multi-branch fiber optics radiation collection system as shown in FIG. 2.

Referring to FIG. 2, a fiber-optics radiation collection and delivery system (also referred to herein more generally as a "radiation collector") for a multi-channel spectrometer in one embodiment of the invention is shown generally as 20. The radiation collector 20 allows for the simultaneous collection of radiation from various sources, various objects and various points of the objects, as is shown in FIG. 2 for example, with one exemplary target 201 and several sources referenced by a single number of 220a-220d. Radiation collector 20 may contain as many branches as needed, but not more, however, than the number of branches which can physically match to the length of the entry port or slit (e.g. slit 103 of FIG. 1) of a spectrum disperser 104 of FIG. 1; the length of which is determined by the width of an applied detector array 105 of FIG. 1.

The following convention has been applied to the figures in this description of the invention: the first digit on a part number on each drawing refers to the number of the figure, therefore, from now hence, the reference to the figure number will not be given separately. Second and further digits have the same value on all drawings and in reference numbers of the same part in different figures will be given separated by slash. Parts performing identical functions in different places are market with consecutive letters and if the part is referenced without the letter it means that the presented function or quality applies to all elements of this class.

If target 201 does not generate detectable radiation, it has to be illuminated directly or by means of some optical elements [not shown] by radiation from at least one external source 220a [other possible sources are not shown]. The radiation directly or indirectly produced by target 201 is collected for a required numbers of points (e.g. three points as shown in FIG. 2) with a corresponding number of fiber optic collectors 221a-221c (made in the form of a single fiber or a bundle of fibers), optionally equipped on one or both ends [not shown on the respective second ends in FIG. 2] with individual performance enhancing optical elements 222a-222c, such as, for example, micro-lenses, mirrors, graded-index lenses, diffractive optical elements and other performance enhancing elements as known in the art.

Similarly, other fiber optic collectors 221d-221g, optionally also equipped on one or both ends of respective performance enhancing optical elements 222d-222g, are used to collect reference signals from various sources. For example, one of them, 222d can capture the direct or indirect radiation from source 220a illuminating target 201 (this signal could be eventually used as the reference to monitor variability of the illumination source 220a), and others 222e-222g from one or more direct or indirect auxiliary sources 220e-220g containing easily recognizable spectral features, for monitoring the stability of wavelength calibration of the spectrum disperser 104 where required.

Any source with clear and easily recognizable spectral features, such as, for example, spectral lamps, narrow-band stable lasers, narrow-band spectrally stable light emitting diodes (LEDs), narrow-band fluorescence sources or narrow-band absorbance bands produced by various absorbers when illuminated with spectrally wide-band radiation, and other known sources may be used. Position stability of the distinctive spectral features produced by such sources on the surface of the photodetector array 105 can be used for verification of wavelength calibration, and to provide a measure for the evaluation of the wavelength stability of the spectrum disperser 104 as well as provide means for its correction if for some reason, the analyzer does not secure the required wavelength stability.

The radiation captured by all the fiber optic collectors 221a-221g is delivered to the corresponding optional individual attenuators 223a-223g, and the attenuated radiation is captured by a set of fiber optic guiding elements 224a-224g whose exit ends are arranged along the line at exit plane 2025 of the common terminator 225 as shown generally by the reference "A" in FIG. 2. The order of the fibers in the line arrangement formed by ends 226a-226h) may differ from that shown in the FIG. 2.

Some guiding elements may be left blinded (e.g. 224h), for dark signal measurements, where a primary goal is to use a dark signal for compensation of temperature-related noise and sensitivity changes of the array. The same effect can be achieved by a local screening of a part of the photodetector array.

Figure 3:
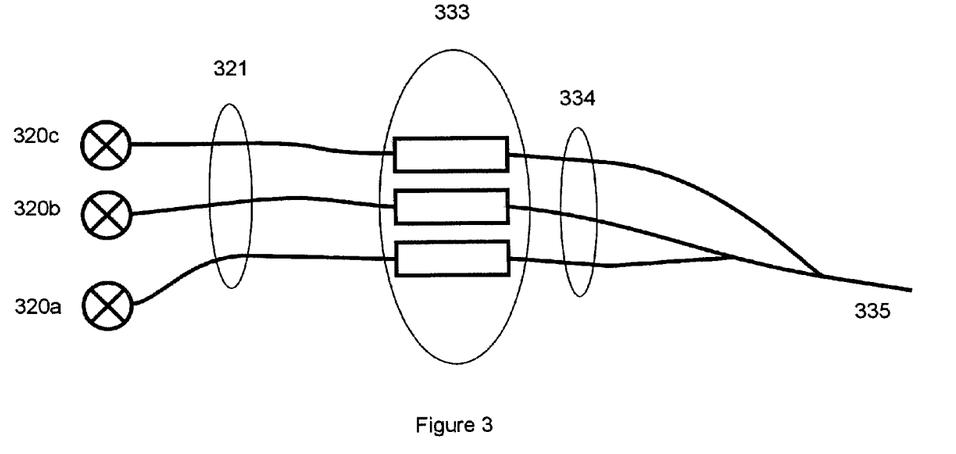
FIG. 3 is a schematic diagram illustrating components of a wavelength reference signal combiner in an embodiment of the present invention.

While the radiation from different wavelength reference sources (e.g. 220e-220g) can be captured by different optical fibers or fiber optic bundles (also referred here to under name guides, e.g. 221e-221g), and delivered to separate points of slit 103 as all other signals, in one embodiment of the invention, the radiation from these sources is combined by means of a special wavelength reference signal combiner, as shown in FIG. 3. Depending on the application, one or both ends of fiber optic guides may be equipped with performance enhancing elements including, but not limited to lenses, micro-lenses, mirrors, graded-index lenses, diffractive optical elements and other performance enhancing elements as known in the art.

FIG. 3 illustrates a wavelength calibration branch with multiple monochromatic sources for dynamic wavelength calibration of a spectrum disperser (e.g. spectrum disperser 104).

The radiation from at least one or several sources 320a-320c, either producing recognizable stable spectral features (such as, for example, spectral, fluorescent, and other lamps with narrow spectral bands, narrow band stable wavelength lasers, narrow band stable light emitting diodes (LEDs) and other narrow band sources as known in the art) or used to produce such features by means of some additional optical elements modifying spectral composition of the interacting radiation (e.g. from broad band sources such as incandescent lamps, arc lamps, wide-band LEDs and others as known in the art, and equipped with, for example, narrow band absorbing filters, interference filters, polarizing color filters and other filters known in the art), directly or after suitable spectral modifications as described above with some additional optical means, is transmitted through separate fibers or fiber optic bundles 321 coupled to the respective sources, and delivered to the radiation controlling units 333.

The radiation controlling units 333 may individually modify, if required, the spectrum and radiant flux of radiation delivered by the particular fiber optic guides 321, and both ends of guides 321 may be equipped with additional optical elements (e.g. lenses, micro-lenses, mirrors, graded-index lenses, diffractive optical elements and other performance enhancing elements known in the art).

The radiation modified by units 333 is once again transmitted into fibers 334 coupled to units 333, and the entry end of the fiber 334 may be equipped with performance enhancing elements (e.g. lenses, micro-lenses, mirrors, graded-index lenses, diffractive optical elements and other performance enhancing elements known in the art), whose exit ends are fused or coupled together to produce a single fiber 335 (which may similarly be equipped with performance enhancing elements as noted above) containing the suitably adjusted signals from all sources 320a-320c.

Fiber 335 containing these combined signals can be further used as a fiber optic collector (e.g. one or more of 221a-221g) and can be connected to an attenuator (e.g. one or more of 223a-223g), where the combined flux is adjusted again to match the tested signals. Through the corresponding fiber optic guides (e.g. 224a-224g) signals are delivered to a fiber optic bundle terminator (e.g. 225), where the fiber optic signals are packed along a line, thereby creating a line of fiber optic cross sections on a face (e.g. in the plane 2025) of the terminator 225, as shown by reference "A" of FIG. 2.

Referring back to FIGS. 1 and 2, the output plane 2025 of the terminator 225 is equivalent with the exit plane 1025 of the radiation collecting and delivery system 102, and can be either directly delivered to the entry slit 103 of the spectrum disperser 104, or to the entry slit port of the radiation modifying unit 1022, which relays the image of the output plane 2025 to the entry slit 103.

It will be understood by persons skilled in the art that at a price of reduced performance, some elements shown in FIG. 2 and FIG. 3 may be omitted in variant embodiments of the invention, if the output of some or all wavelength calibration sources can be controlled separately, for example, through power suppliers, or if there is no need for individual adjustment of the spectrum or intensity of the signal delivered by separate sources. Such variations are extended to be within the scope of the present invention.

Figure 4:
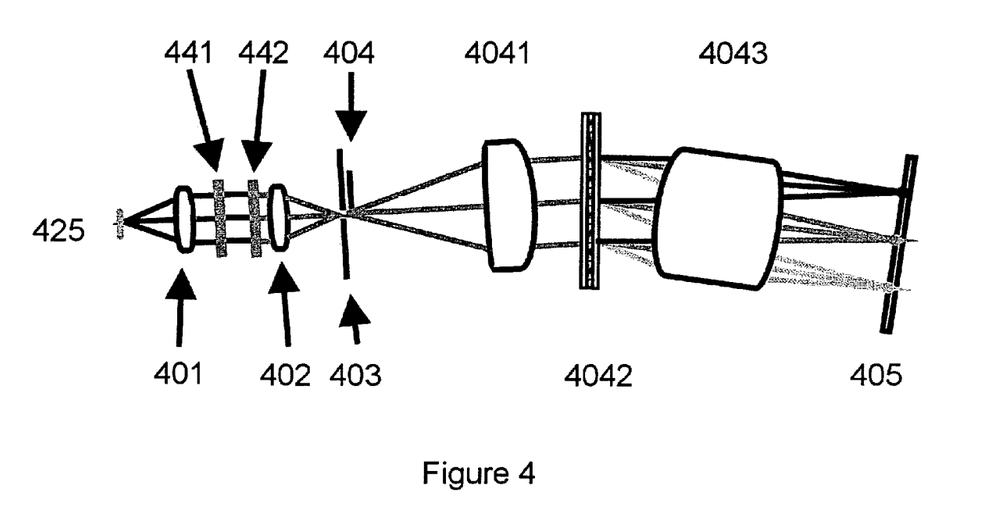
FIG. 4 shows the structure of the spectrum analyzing part of the multi-channel spectrum analyzer port in an embodiment of the invention in greater detail, specifically illustrating the relation between the slit, collimating optics, grating, focusing optics and detector array in this embodiment.

Referring to FIG. 4, the structure of the spectrum analyzing part of the multi-channel spectrum analyzer port is illustrated in an embodiment of the present invention. As is shown in FIG. 4, the radiation modifying unit (e.g. 1022) consists of two lenses 401 and 402 arranged in such a way that they work as an optical relay system, which relays the magnified, non-magnified or de-magnified image of the entry plane 425, (which coincides with the exit plane 1025/2025) to the exit port 403 (which in this example coincides with the entry port 103 of the spectrum disperser 104.

The first lens 401 essentially transforms the divergent beams leaving each point of entry plane 425 into collimated beams, and the second lens 402 focuses these collimated beams back to the points in the exit plane 403 of the radiation modifying unit, which coincides with the entry plane 103 of the spectrum disperser.

The main role of the radiation modifying unit is to filter out the radiation outside of the working band, to eliminate possible interference of the second order and potentially to reduce the scattered radiation contributed by the unused part of the spectrum. This can be performed using a cut-on filter 441. To equalize response of the instrument through suppression of the radiation in the areas of the spectrum when the signal achieves the highest level, a spectrum shaping filter 442 may be employed. Both filters 441, 442 are placed between lenses 401 and 402. Such equalization improves the signal-to-noise ratio in spectral areas where the signal is weak. The two filters 441, 442 may be combined into a single element [not shown] either through coupling by glue (which would essentially eliminate reflection losses on two glued surfaces), or by the deposition of suitable thin film layers on one or both sides of the same element, able to perform some spectral modification of the transmitted radiation. While positioning such filters inside optical relay system where beams emerging from particular points of slit are essentially collimated has certain advantages, and for this reason their second preferred position is between lenses 4041/5041 and 4043/50431 of the spectrum disperser 104, where the grating is placed, essentially they can be placed in any place between the terminator of the radiation collecting and delivery system 102 and the detector array 105. Furthermore, some filters can be a part of the grating 4042 as a substrate or a cover glass.

Figures 5A, 5B:
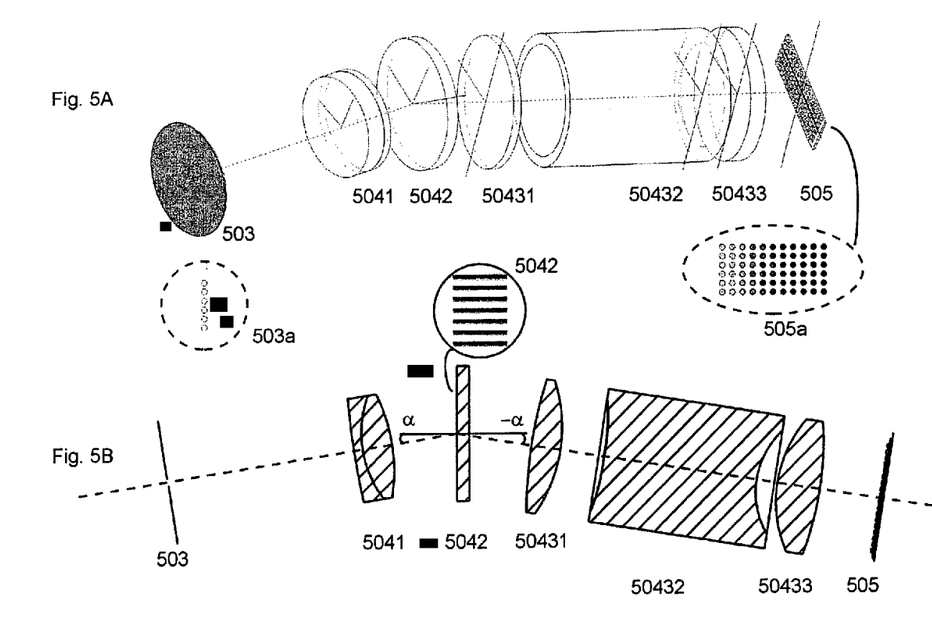
FIGS. 5a, 5b, and 5c show the optical design of a spectrum disperser in an embodiment of the present invention in multiple views.
Figure 5C:
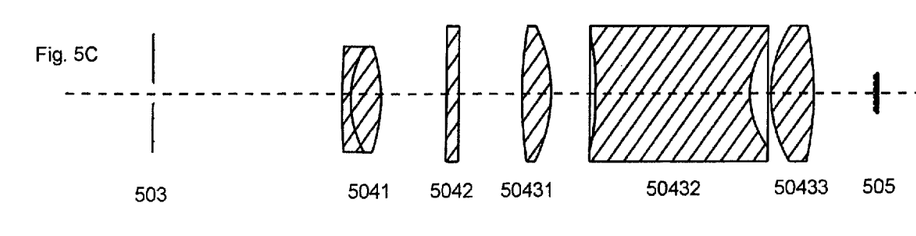

The image produced by radiation collecting and delivery system 102, which may or may not contain radiation modifying block 1022, is projected into the entry plane 103 of the spectrum disperser 104, where the slit of the disperser is placed perpendicular to the optical axis and to the plane of the drawing in FIG. 1, FIG. 4 and FIG. 5B. If the image already has a shape of a narrow line, as is the case when it is made of faces of the optical fibers arranged into a line, the slit may be omitted. In that case, either the image of the fibers (when the radiation modifying block 1022 is used) or the fibers themselves may act as the slit.

The radiation emerging from the slit can then be blocked by an optional shutter 404, with shutter 404 being placed very close to the slit 403, to reduce a leak of radiation around the shutter to the further part of the spectrum disperser 104. Shutter 404 is used for blocking the radiation from proceeding further into the disperser when the other components of the spectrum analyzer are aligned, when, for example, the radiation source is too strong, when dark signal of the array is measured and for when the electronics of the spectrum analyzer require that no signal be present for the reading out of previously acquired signals. It will be understood by those skilled in the art that the shutter can be also placed in many other places before and after slit 103/403.

The radiation emerging from the slit (or slit-like image or slit-like object) having passed by the optional shutter 404, enters the disperser (e.g. 104 of FIG. 1), the components of which are shown in greater detail in FIGS. 4 and 5a through 5c in an embodiment of the present invention. The divergent radiation emerging from the slit, the slit-like image or the slit-like object (these terms are used interchangeably with the more general term "slit" herein), delivered to the entry plane 103/403/503 of disperser 104 is collected by a collimating achromatic lens 4041/5041, which transforms divergent polychromatic beams of radiation emerging from each point of the slit into collimated polychromatic beams. The collimated beams are delivered to a transmission diffraction grating 4042/5042 with essentially periodic diffractive structure (fringes of grating) in a form of essentially straight and essentially parallel diffraction lines or strips, elongated parallel to the long dimension of the slit, i.e. essentially perpendicular to the drawing plane of FIG. 4 and FIG. 5B and perpendicular to the plane of drawing in FIG. 5C.

The grating transforms each collimated polychromatic beam emerging from the lens 4041/5041 into a fan of monochromatic beams propagating in different directions as determined by the equation (1). The angular spread out of the diffracted beams depends on period d of the grating as can be easily seen from the equation (1), and is selected to bring a required spectral band, determined by shortest $\lambda_1$ and longest desired wavelength $\lambda_2$, to the array of photodetector of given length l, applying focusing lens with the focal length f. The required period will vary depending on the incident angle of the beam approaching the grating.

The present inventors have realized that for a desired angular span $\delta$ between propagation directions of the beams with desired wavelengths $\lambda_1$ and $\lambda_2$, the astigmatism introduced by the grating reaches a minimum in the entire working spectral range when the axis of the incident beam is perpendicular to the fringes, and creates, with normal to the grating, the angle α (FIG. 5B), given by the equation:

$$\alpha = atg\left[\frac{\lambda_2 + \lambda_1}{\lambda_2 - \lambda_1} \cdot tg\left(\frac{\delta}{4}\right)\right] \quad (2)$$

and, simultaneously, when the period of the grating d, fulfills the condition:

$$d = \frac{\lambda_2 - \lambda_1}{2 \cdot \cos(\alpha) \cdot \sin\left(\frac{\delta}{2}\right)} = \frac{\sqrt{(\lambda_2 - \lambda_1)^2 + (\lambda_2 + \lambda_1)^2 \cdot tg^2\left(\frac{\delta}{4}\right)}}{2 \cdot \sin\left(\frac{\delta}{2}\right)} \quad (3)$$

The wavelength $\lambda_0$ on axis of the fan, given by equation:

$$\lambda_0 = 2 \cdot d \cdot \sin(\alpha) \quad (4)$$

is free of the astigmatism and is always a bit longer than the central wavelength $\lambda_c = (\lambda_1 + \lambda_2)/2$ of the used band. Where "atg" =artangent; "tg"=tangent; "cos" =cosine; and "sin" =sine.

Some departure from conditions (2) and (3) may be acceptable, and may be needed, if, for example, higher performance is required for wavelengths closer to some end of the used spectral range. It is important to notice that if the ratio of the wavelength $\lambda_2$ to the wavelength $\lambda_1$ is equal, for example, r:

$$\frac{\lambda_2}{\lambda_1} = r \quad (5)$$

then equation (2) takes a form:

$$\alpha = atg\left[\frac{(r+1)}{(r-1)} \cdot tg\left(\frac{\delta}{4}\right)\right] \quad (2a)$$

and, simultaneously, the period of the grating d, should fulfill the condition:

$$d = \frac{(r-1) \cdot \lambda_1}{2 \cdot \cos(\alpha) \cdot \sin\left(\frac{\delta}{2}\right)} \quad (3a)$$

It follows from the above, that for a constant ratio of wavelength $\lambda_2$ to the wavelength $\lambda_1$, the optimal incident angle remains the same regardless of the spectral band, while period d of the grating should by adapted to the used spectral band, defined in this case by its short wavelength edge $\lambda_1$, and ratio r of the wavelength $\lambda_2$ at the long wavelength end to the wavelength $\lambda_1$ at the short wavelength end of the working spectral band. This very important observation allows for the use of the same geometry of the disperser regardless of the spectral band, as long as the effective focal length of the focusing objective and the length of the detector array in the direction of the wavelength dispersion, which together determine the required angular span of the fan of the used diffracted radiation, remain unchanged.

This feature is used advantageously in a spectrum analyzer designed in accordance with one embodiment of the present invention. This allows for the use of the same geometrical configuration to cover the same relative working spectral band: about one octave in the spectral range from about 400 nm to about 2500 nm in this embodiment.

Furthermore, minimization of the astigmatism introduced by the grating advantageously reduces the amount of the aberrations, which together with other aberrations have to be compensated with other optical elements. As a result, the reduced astigmatisms of the grating reduces the amount of aberrations requiring compensation and leaves more freedom in the design of other optical components of the disperser. It also allows for a simpler design of the high performance instrument, which is able to work in a wide spectral range.

In particular, the collimation of the radiation emerging from the slit can be performed with a relatively simple doublet 4041/5041, which requires only a minor re-alignment when used in different spectral bands, made of materials transparent in the entire spectral range of about 400 nm to about 2500 nm. The collimated radiation approaches the grating 4042/5042, having a period derived from equation (3), from the mean direction perpendicular to the fringes of the grating, creating with the normal to the grating the angle α derived from equation (2). Satisfaction of these two conditions causes the center of the fan of diffracted beams to create an angle—α with the normal to the grating, and is captured by focusing objective 4043, consisting of three lenses: a relatively thin positive lens 50431; a very thick, rod-like negative lens 50432, made of a material of higher refractive index than the remaining two lenses; and a relatively thin positive lens 50433 made of the same material as lens 50431. Critical factors in this design are the axial thickness of the negative lens and the proper selection of refractive properties of used glasses.

Some design parameters of a system in one embodiment of the invention are provided in an example solution shown in the table below:

| Radius of curvature | Thickness of the lens or distance between lenses in air | Refractive index | Abbe number |
|---|---|---|---|
| $r_1 = 37.00$ | $d_1 = 6.6$ | $n_1 = 1.6127$ | $v_1 = 58.6$ |
| $r_2 = -134.20\infty$ | $d_2 = 9.4$ | | |
| $r_3 = -53.35$ | $d_3 = 42.4$ | $n_3 = 1.6727$ | $v_3 = 32.2$ |
| $r_4 = 23.35$ | $d_4 = 8.3$ | | |
| $r_5 = 36.60$ | $d_5 = 7.3$ | $n_5 = 1.6127$ | $v_5 = 58.6$ |
| $r_6 = -82.06$ | | | |

The maximum errors in the values in the above table are as follows:

the radii of curvatures: ±0.02 mm;

thickness of the lenses and the distances between them: ±0.01 mm;

refractive indices: ±0.0001; and

Abbe numbers: ±0.1.

In one embodiment of the invention, the objective co-operates with the volume phase holographic transmission diffraction grating sandwiched between two plates 1.5 mm thick. The grating is placed in the entry pupil of the objective, 20 mm from the first lens. For this design, the specific relative thickness of the negative lens, calculated as the ratio of its thickness to the focal length of whole objective, is 0.404; the equivalent focal length of the objective is 105.03 mm, the relative focal length of the first lens is 0.457, and the relative focal lengths of the negative lens and the last lens are −0.188 and 0.403 respectively. The period of the grating has been selected to distribute spectral band from 550 nm to 1100 nm across an array 24.58 mm long. The angle between the fan axis and normal to the detector array 110 is 1° 25', and depends on the selected spectral working band.

Figure 6:
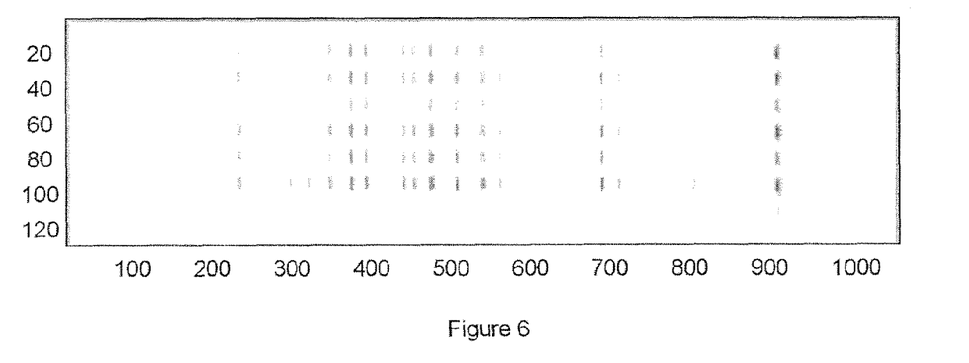
FIG. 6 shows an example image of the six spectra simultaneously collected at six points along a finger-like spectral lamp.

The system in this embodiment of the present invention produces practically stigmatic points for any selected band not much larger than one octave in the entire working spectral range, and produces equal length images of the slit for all wavelengths of the working band, as shown in the example output of FIG. 6.

Referring to FIG. 6, the image (shown inverted for clarity) captured with the detector array 105/405/505 represents spectra of radiation collected at six different points of a standard pen-like spectral lamp. The radiation was collected by six optical mono-fibers and delivered to six different points of the slit. The spectra of the radiation delivered to each fiber are dispersed in the horizontal direction. FIG. 6 clearly demonstrates that the instrument built in accordance with this embodiment of the invention indeed produces the images of the slit of constant height regardless of wavelength, as is demonstrated in FIG. 6 by the constant vertical separation of corresponding points from different rows. Application of identical glass for production of the first and last lens of the objective provides an additional advantage, since this simplifies production and reduces production cost.

The same set of lenses, covered with different anti reflecting layers, was also used in the spectral ranges 430 nm to 860 nm, and 820 nm to 1640 nm. Because of the limited performance of available cut-on filters for elimination of the higher diffraction order, the effective working range, free of higher diffraction orders, was about 10% narrower.

While the data provided in FIG. 6 illustrates one example of the focusing objective implemented in an embodiment of the present invention, it does not represent the only possible solution and other solutions comprising one or more features of the invention may be employed.

For example, other solutions exploiting the concept of a thick, rod-like negative lens made of the material of the higher refractive index than that of the positive lenses, in application to different spectral ranges and arrays of different length, are possible. Such solutions where the thickness of central negative lens is of the order of half length of the focal length of the whole objective and the lens is made of material with a refractive index higher than the remaining lenses in a solution where rays of different wavelength travel different optical paths are intended to be within the scope of the present invention.

The present invention has been described with regard to a number of embodiments. However, it will be understood by persons skilled in the art that a number of variations and modifications can be made without departing from the scope of the invention as described herein and defined in the appended claims.

The invention claimed is:

1. A multi-channel spectrum analyzer with a plane transmission diffraction grating, comprising:
   a. polychromatic radiation collecting and delivery elements adapted to collect polychromatic radiation simultaneously from a plurality of points of one or more sources of electromagnetic radiation and to deliver the polychromatic radiation in the form of a spatial distribution of the polychromatic radiation to a spectrum disperser;
   b. the spectrum disperser coupled to said polychromatic radiation collecting and delivery elements for transmitting polychromatic radiation, the spectrum disperser comprising
      i. an entry port,
      ii. a composite achromatic collimating lens for transforming divergent beams of polychromatic radiation ranging between wavelengths $\lambda_1$ and $\lambda_2$ emerging from each point of the entry port into collimated polychromatic beams,
      iii. a transmission diffraction grating for transforming each collimated polychromatic beam produced by the composite achromatic collimating lens into a fan of diffracted collimated monochromatic beams, each diffracted collimated monochromatic beam having a wavelength ranging between said wavelengths $\lambda_1$ and $\lambda_2$, and
      iv. a composite focusing objective to transform each diffracted collimated monochromatic beam in each fan into a separate spot of radiation of a flat spectral image;
   c. a photodetector array placed in the plane of the flat spectral image for detecting radiation transmitted by the spectrum disperser and converting said radiation transmitted by the spectrum disperser into an electric signal.

2. The analyzer of claim 1, wherein a spectral working band of the spectrum disperser, ranging between said wavelengths $\lambda_1$ and $\lambda_2$, is within a spectral range of about 400 nm to about 2500 nm.

3. The analyzer of claim 1, wherein for an angular span δ of beams entering the objective with a spectral band whose shortest wavelength is $\lambda_1$ and longest wavelength is $\lambda_2$, wherein ratio r is equal to $\lambda_2/\lambda_1$, the analyzer comprises a plane diffraction grating having a linear diffraction structure with period given by formula $$d = \frac{\sqrt{(\lambda_2 - \lambda_1)^2 + (\lambda_2 + \lambda_1)^2 \cdot tg^2\left(\frac{\delta}{4}\right)}}{2 \cdot \sin\left(\frac{\delta}{2}\right)},$$

wherein for a given ratio r, the normal to the surface of the grating creates with the axis of an incident polychromatic beam an angle x, independent on position of the working band in electromagnetic spectrum, and given by the formula $$\alpha = atg\left[\frac{(r+1)}{(r-1)} \cdot tg\left(\frac{\delta}{4}\right)\right],$$

and wherein the fringes of the linear diffraction structure of the grating are perpendicular to the plane determined by the normal to the surface of the grating and the axis of the incident beam.

4. The analyzer of claim 1, wherein the polychromatic radiation collection and delivery elements comprise a plurality of fiber optic radiation guides for transmitting collected polychromatic radiation.

5. The analyzer of claim 4, wherein at last one radiation guide is coupled to at least one performance enhancing element, at one or more ends thereof, wherein each performance enhancing element is selected from the following group: a lens, a micro-lens, a mirror, a graded-index lens, and a diffractive optical element.

6. The analyzer of claim 4, wherein at least one radiation guide is coupled to at least one radiation controlling element, at one or more ends thereof.

7. The analyzer of claim 4, wherein the plurality of radiation guides are coupled to a terminator element to arrange said guides along a straight line.

8. The analyzer of claim 1, further comprising calibration elements for producing a wavelength calibration signal.

9. The analyzer of claim 8, wherein said calibration elements are adapted to receive radiation from at least one wavelength calibration sources, and transmit said radiation within at least a single fiber optic radiation guide.

10. The analyzer of claim 1, wherein said composite focusing objective comprises two positive thin lenses and a negative thick lens, wherein the negative thick lens is positioned between the two positive thin lenses, and the specific relative thickness of the negative thick lens, calculated as the ratio of its thickness to the focal length of the composite focusing objective is about 0.404, the equivalent focal length of the composite focusing objective is about 105.03 mm, the relative focal length of the first thin positive lens is about 0.457, and the relative focal lengths of the negative thick lens and each positive thin lens are about −0.188 and about 0.403 respectively.

11. The analyzer of claim 10, wherein said composite focusing objective comprises two positive thin lenses and a negative thick lens, wherein the negative thick lens is positioned between the two positive thin lenses.

12. The analyzer of claim 11, wherein each positive thin lens is composed of a material having a refractive index between about 1.60 and about 1.62 and an Abbe number between about 58 and about 59, and wherein the negative thick lens is composed of a material having a refractive index between about 1.66 and about 1.68 and an Abbe number between about 31 and about 33.

13. The analyzer of claim 11, wherein the ratio of the axial thickness of the negative thick lens to the focal length of the composite focusing objective is between about 0.38 and about 0.42.

14. The analyzer of claim 11, wherein the ratio of the focal length of one positive thin lens to the focal length of the composite focusing objective is between about 0.45 and about 0.47.

15. The analyzer of claim 11, wherein the ratio of the focal length of the negative thick lens to the focal length of the composite focusing objective is between about −0.18 and about −0.20.

16. The analyzer of claim 11, wherein the ratio of the focal length of one positive thin lens to the focal length of the composite focusing objective is between about 0.39 and about 0.41.

17. The analyzer of claim 11, wherein the two positive thin lenses are composed of the same material, and wherein the negative thick lens is composed of a material different from the material of the two positive thin lenses.

18. The analyzer of claim 1, wherein the array is positioned within the analyzer to perform simultaneous registration of spectral composition of polychromatic radiation ranging between wavelengths $\lambda_1$ and $\lambda_2$ diffracted by the transmission diffraction grating and emerging from each point of the entry port.

19. The analyzer of claim 1, wherein the normal to the surface of the transmission diffraction grating creates with the axis of an incident polychromatic beam an angle $\alpha$ as determined by the equation $$\alpha = arg\left[\frac{\lambda_2 + \lambda_1}{\lambda_2 - \lambda_1} \cdot tg\left(\frac{\delta}{4}\right)\right]$$

wherein $\delta$ is the angle between the diffracted directions of radiation $\lambda_1$ and $\lambda_2$.

20. A spectrum disperser for a multi-channel spectrum analyzer, the spectrum disperser for coupling to polychromatic radiation collecting and delivery elements adapted to collect polychromatic radiation simultaneously from a plurality of points of one or more sources of electromagnetic radiation and to deliver the polychromatic radiation in the form of a spatial distribution of the polychromatic radiation to the spectrum disperser, the spectrum disperser comprising:

i. an entry port, ii. a composite achromatic collimating lens for transforming divergent beams of polychromatic radiation ranging between wavelengths $\lambda_1$ and $\lambda_2$ emerging from each point of the entry port into collimated polychromatic beams, iii. a transmission diffraction grating for transforming each collimated polychromatic beam produced by the composite achromatic collimating lens into a fan of diffracted collimated monochromatic beams, each diffracted collimated monochromatic beam having a wavelength ranging between said wavelengths $\lambda_1$ and $\lambda_2$, and iv. a composite focusing objective to transform each diffracted collimated monochromatic beam in each fan into a separate spot of radiation of a flat spectral image.

* * * * *